(12) United States Patent
Jousse et al.

(10) Patent No.: US 8,272,177 B2
(45) Date of Patent: Sep. 25, 2012

(54) SOLAR ROOFING ASSEMBLY

(75) Inventors: Didier Jousse, Taverny (FR);
Jean-Pierre Douche, Le Plessis-Brion (FR); Chantal Sergent, Orrouy (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 13/131,463

(22) PCT Filed: Dec. 1, 2009

(86) PCT No.: PCT/FR2009/052360
§ 371 (c)(1),
(2), (4) Date: May 26, 2011

(87) PCT Pub. No.: WO2010/063944
PCT Pub. Date: Jun. 10, 2010

(65) Prior Publication Data
US 2011/0232213 A1    Sep. 29, 2011

(30) Foreign Application Priority Data
Dec. 1, 2008    (FR) ...................................... 08 58148

(51) Int. Cl.
*E04D 13/18*    (2006.01)
*E04H 14/00*    (2006.01)

(52) U.S. Cl. ............................. 52/173.3; 52/478; 52/518

(58) Field of Classification Search ................ 52/173.3, 52/251, 586.1, 586.2, 582.2, 582.1, 656.1, 52/665, 726.2, 478, 518; 136/244, 251; 126/621–623, 678, 704, 705
See application file for complete search history.

(56) References Cited

U.S. PATENT DOCUMENTS

| | | | | |
|---|---|---|---|---|
| 6,119,415 A | * | 9/2000 | Rinklake et al. | 52/173.3 |
| 2003/0121228 A1 | * | 7/2003 | Stoehr et al. | 52/518 |
| 2006/0118163 A1 | | 6/2006 | Plaisted et al. | |
| 2006/0213548 A1 | * | 9/2006 | Bachrach et al. | 136/251 |
| 2007/0094976 A1 | * | 5/2007 | McClintick | 52/478 |
| 2007/0227583 A1 | | 10/2007 | Davies et al. | |
| 2008/0083176 A1 | * | 4/2008 | Barsun et al. | 52/173.3 |
| 2008/0155908 A1 | * | 7/2008 | Nomura et al. | 52/173.3 |
| 2008/0289272 A1 | * | 11/2008 | Flaherty et al. | 52/173.3 |

FOREIGN PATENT DOCUMENTS

| | | |
|---|---|---|
| DE | 44 44 439 | 4/1995 |
| GB | 2 407 634 | 5/2005 |
| JP | 8 42081 | 2/1996 |
| JP | 2000 130859 | 5/2000 |
| JP | 2000 265620 | 9/2000 |

OTHER PUBLICATIONS

International Search Report issued Mar. 1, 2010 in PCT/FR09/52360 filed Dec. 1, 2009.

* cited by examiner

*Primary Examiner* — Brian Glessner
*Assistant Examiner* — Brian D Mattei
(74) *Attorney, Agent, or Firm* — Oblon, Spivak, McClelland, Maier & Neustadt, L.L.P.

(57) ABSTRACT

A solar roofing panel includes at least one photovoltaic device, including a front structure and a rear structure, and at least one solar collector capable of delivering hot water, including a front structure and a rear structure. The respective front structures of the photovoltaic device and of the solar collector include glass substrates forming a cover that has an upper face, to face an external environment, and an opposed inner face, the respective rear structures of the photovoltaic device and of the solar collector being placed beneath the cover, facing the inner face. The glass substrates have no metal frames and are joined together, or are separated by other transition glass substrates, so as to form a uniform unitary glass cover.

17 Claims, 3 Drawing Sheets

SOLAR ROOFING ASSEMBLY

CROSS-REFERENCE TO RELATED APPLICATIONS

The present document is the U.S. counterpart of WO 2010/063944, and claims priority to French Application No. 0858148 filed on Dec. 1, 2008, the entire contents of each of which are herein incorporated by reference.

BACKGROUND

1. Field

The invention relates to a solar roofing assembly comprising devices capable of collecting solar energy in order to provide electrical and thermal energy, such as electricity-generating photovoltaic systems and solar collectors used for hot-water production, respectively.

2. Description of the Related Art

For a number of years, for economic reasons, there has been a growing interest in the use of solar energy for partly meeting the electricity and/or hot-water consumption requirements of homes or commercial premises.

To meet electricity requirements, it is known to place photovoltaic modules on roofs, said modules comprising photovoltaic cells coupled in series to one another and generating a DC current when they are exposed to light.

In general, a photovoltaic module is formed from a photovoltaic panel incorporating the photovoltaic cells and a metal frame surrounding and supporting the panel, this frame moreover incorporating the electrical distribution cables. The photovoltaic panel is designed, at least on its front face, the one facing the external environment, with a glass substrate. To give an example, the panel includes a glass substrate therefore constituting its front face, a plastic film or a glass substrate constituting its rear face. Inserted between the front and rear face substrates are one or more polymer interlayers and a photovoltaic element, which is formed by a stack of semiconductor materials sandwiched between two metal electrodes. The semiconductor materials are, for example, based on crystalline silicon or on thin films.

For specific hot-water requirements, particularly for sanitary use and possibly for floor or wall heating, it is also known to provide roofs with solar collectors. In particular, these collectors take the form of modules, which include a transparent cover, such as a glass substrate, and an absorber. The absorber is an element through which a heat-transfer fluid flows, such as simply water to be heated. The transparent cover lets the solar radiation pass through it to the absorber, in order to heat the fluid flowing therein, and advantageously confines the infrared radiation, thus minimizing absorber cooling. Furthermore, to prevent thermal losses from the absorber, a thermal insulation is placed to the rear and around the periphery of the module.

However, depending on the sunshine or certain temperature conditions, such as winter conditions, these solar collectors are incapable of providing sufficiently hot water. It is therefore necessary to couple water production to a complementary installation for heating water by gas or electricity, which in the end results in production costs that are not always economic considering the purchase cost and installation cost of these collectors.

Moreover, other systems using the solar energy resource, such as thermal modules delivering hot air, are known. For this purpose, United States patent application US 2006/0118163 not only proposes to place photovoltaic modules on a roof but also hot-air thermal modules. These hot-air thermal modules or collectors include substrates that let through the solar energy, and a space in which air is confined so as to be heated thanks to said energy. Distribution ducts are connected to these modules for capturing hot air and in order to feed air to be heated into the confinement space.

However, although such thermal modules may be used for hot-air production, they do not meet hot-water production requirements insofar as the air/water heat exchangers would necessitate a considerable heat exchange area and would not enable the required temperatures for domestic hot water, especially for sanitary purposes, to be achieved.

It may be envisioned to combine these photovoltaic modules and hot-air and/or hot-water thermal solar collectors on roofs. However, as currently configured, they result in a substantial investment for a dwelling. In practice, homeowners choose instead to install high-performance insulation in their homes, optionally combined with one or other of the thermal energy and electrical energy supply solutions described above, but rarely combine these solutions.

In addition, these photovoltaic modules and thermal solar collectors, although able to be integrated into the roofing and attached without projecting from the roofing, do not provide an aesthetically attractive unit over the entire surface of the roof.

The object of the invention is therefore to provide a solar roofing assembly that incorporates at least one photovoltaic device and at least one thermal solar collector for hot-water production, this roofing assembly having the following advantages:

low installation costs;
delivery of a highly efficient assembly, producing, thanks to the thermal solar collector and to the exclusive configuration of the roofing, without requiring complementary independent heating systems, very hot water directly usable for sanitary purposes;
minimal thermal loss;
a guaranteed attractive appearance.

SUMMARY

For this purpose, one subject of the invention is a solar roofing assembly comprising at least one photovoltaic device, having a front structure and a rear structure, and at least one thermal solar collector capable of delivering hot water, called a hot-water solar collector, having a front structure and a rear structure, the respective front structures of the photovoltaic device and of the hot-water solar collector consisting of glass substrates forming a cover that has an upper face intended to face the external environment, and, on the opposite side, an inner face, the respective rear structures of the photovoltaic device and of the hot-water solar collector being placed beneath the cover, facing the inner face, characterized in that said glass substrates have no metal frames and are joined together, being optionally separated by other glass substrates, called transition substrates, so as to form a uniform unitary glass cover.

Thus, this roofing assembly combines several energy recovery systems capable of producing electricity and hot water.

Furthermore, the configuration of the front structures of the photovoltaic devices and of the solar collectors, thanks to glass substrates similar in their shape and their appearance, provides a covering or cover with unitary surface continuity without any difference in appearance, at least in the zone where the photovoltaic devices and the thermal solar collectors are combined, and preferably over the entire roofing assembly area.

The roofing assemblies will no longer have, as is currently the case, disparities in height and appearance at the points where these energy recovery systems are integrated.

In addition, in accordance with the invention, the photovoltaic devices and hot-water solar collectors of the solar roofing assembly do not have metal frames, thereby providing better energy efficiency of the solar roofing assembly. This is because metal frames surrounding the photovoltaic devices and the solar collectors constitute stoppage points for the air flow within the solar roofing assembly, whether by natural convection or by forced convection. The absence of metal frames makes it possible for the thermal bridges to be significantly reduced and promotes uniform heat exchange within the roofing assembly. This results in there being no discontinuity in the coupling between the photovoltaic devices and the solar collectors.

Finally, this cover formed by glass substrates is simple to install, just like any usual covering of the tile or slate type. Experts capable of fastening solar collectors have merely to mount the rear structures of said devices and collectors, while the roofer produces the cover of the overall roof separately.

Preferably, the roof has a slope defining a ridge and comprising an upper portion close to the ridge and a lower portion away from said ridge, the or each photovoltaic device being placed in the lower portion, whereas the or each hot-water solar collector is placed in the upper portion.

This distribution of the zones where the photovoltaic devices and the hot-water solar collectors are placed makes it possible to increase the efficiency of the assembly.

To optimize this efficiency, the roofing assembly advantageously includes, beneath the inner face of the cover and perpendicular to its surface, two thermal insulation barriers which are placed laterally on either side of the or each hot-water solar collector, for example at a distance of 5 cm, and so as to leave the zone extending toward the photovoltaic device or devices open.

In fact, the air beneath the roofing assembly is advantageously hot, its heat being especially provided thanks to the solar radiation passing through the glass cover and to the heating of the photovoltaic devices. The insulation barriers therefore make it possible, through their configuration and their specific arrangement which does not form an obstacle to the air coming from the zone where the photovoltaic devices are located, to confine the hot air around the hot-water solar collector, reducing its thermal losses and thus guaranteeing very hot water.

Preferably, the barriers extend beyond the hot-water solar collector, in particular up to a distance of between 10 and 50 cm. This façade zone of the hot-water solar collector ensures that there is a temperature gradient between the air entering this zone and the edge of the collector, otherwise there would be turbulence that could consequently cool the air in this zone.

Advantageously, the roofing assembly includes forced convection means for the forced convection of the air flow circulating beneath the roofing assembly. These forced convection means, comprising in particular one or more air extractors, are capable of regulating the air flow circulating beneath the roofing assembly in order to guarantee, on the one hand, ventilation of the photovoltaic devices, preventing them from being excessively heated, and, on the other hand, a forced supply of hot air to the or each hot-water solar collector. The extractors have a selectively adjustable flow rate according to the zone in which they are placed and/or the environmental conditions. In particular, the adjustment may be obtained by varying the rotation speed of the motors of the extractors, it being possible for this rotation speed to be automatically controlled by a speed controller.

In particular, three air extractors will be arranged beneath the roofing assembly, preferably respectively placed, when two thermal insulation barriers are provided near the hot-water solar collector, in the zone where the hot-water collector is placed, called the central zone, and in the two adjacent zones on either side of said barriers.

In this case, it will be advantageous to establish extraction flow rates such that the velocity $v_2$ of the air in the central zone of the hot-water solar collector and the velocity $v_1$ in each of the adjacent zones have different values, with a $v_2/v_1$ ratio that can be adapted according to the environmental conditions, the season or the time of day.

At the start of the day or in a cold climate, a low air velocity beneath the photovoltaic devices of the order of 0.1 m/s suffices to keep them at a low temperature, and the system will be configured so as to direct the heat toward the hot-water solar collector zone. The following values may in particular be envisioned: $v_1$ between 0 and 0.1 m/s and $v_2$ between 0.1 and 0.3 m/s.

At midday or during the summer period, it is necessary to establish a velocity beneath the photovoltaic devices of greater than 0.3 m/s and this, thanks to a velocity $v_1 > 0.3$ m/s, the velocity $v_2$ being adjusted so as to control the temperature in the hot-water solar collector. If this temperature is below 80° C., a velocity $v_2$ equal to or less than $v_1$ may be applied. However, when this temperature exceeds 80° C., a velocity $v_2$ greater than $v_1$ will be applied in order to ventilate the hot-water absorber, preventing it from overheating, which could otherwise result in the apparatus being damaged.

These various situations will be controlled by a regulating controller, by placing temperature sensors at the appropriate places.

As expressed above, the photovoltaic device may be separated from the hot-water solar collector by a transition zone, the roofing assembly having glass substrates, called transition substrates, in this zone.

One particularly annoying drawback in the case of the existing photovoltaic devices is the temperature rise which greatly degrades their efficiency. The transition zone is advantageous for ventilating the photovoltaic device or devices which thus do not overheat, which would otherwise be the case if they are too close to the hot-water solar collector or collectors.

The function of this transition zone is to ensure that the velocity of the air beneath the photovoltaic devices or modules remains uniform even when the velocities $v_1$ and $v_2$ are very different. The transition zone has a minimum length of between 10 and 50 cm, depending on the configuration of the roof: slope, thickness of the air layer beneath the roofing assembly, mounting system. It will be preferable to take higher values and to enlarge the zone, so as to obtain better decoupling of the velocities between $v_1$ and $v_2$, on the one hand, and the velocity of the air beneath the photovoltaic devices, on the other hand. In practice, the dimension of this zone may correspond to that portion of the roofing assembly not covered by the substrates of the photovoltaic devices and of the hot-water solar collectors.

When the roofing assembly has forced convection of the air flow, this transition zone is advantageously used to include complementary energy recovery systems, namely hot-air thermal collectors capable of generating hot air. These hot-air collectors have a front structure formed by the transition glass substrates and a rear structure beneath the cover, comprising an element that reflects the light energy.

Advantageously, the photovoltaic device or devices, the hot-water solar collector or collectors and the hot-air thermal collector or collectors are each distributed over one-third of the roofing assembly respectively.

According to another feature, the rear structure of the or each photovoltaic device comprises at least one support substrate joined to the front structure, photovoltaic cells being arranged between the front structure and the support substrate or substrates of the rear structure.

According to yet another feature, the rear structure of the or each hot-water solar collector includes an absorber placed at a distance $h_2$ from the front structure of said collector and a thermal insulation placed beneath the absorber, on the opposite side from the cover and in a juxtaposed manner or at a distance $h_1$ from the absorber such that $h_1$ is less than $h_2$, $h_1$ and $h_2$ being such that the quantity $h_1+h_2$ is between 10 and 100 mm, in particular between 30 and 50 mm.

The glass substrates of the or each photovoltaic device and of the or each hot-water solar collector and the transition glass substrates are formed from tempered monolithic glass or from laminated glass. As a variant, they may be double-glazing substrates, except in the case of the photovoltaic devices.

The glass substrates of the or each photovoltaic device and of the or each hot-water solar collector and the transition glass substrates are fastened together by fastening means, such as hooks.

The glass substrates of the or each photovoltaic device and/or of the or each hot-water solar collector, and optionally the transition glass substrates, include functional coatings of the antireflection and/or low-emissivity type.

The roofing assembly is placed on a framework to which the rear structure of the hot-water solar collector and optionally the rear structure of hot-air thermal collectors, the front structure of which is formed from the transition substrates, are joined.

Advantageously, the framework includes thermal insulation means, which comprise a heat-reflecting film placed facing the inner face of the cover. This heat-reflecting film may constitute the thermal insulation of the absorber of the hot-water and hot-air collectors.

BRIEF DESCRIPTION OF THE DRAWINGS

The present invention will now be described with the aid of purely illustrative examples, which in no way restrict the scope of the invention, together with the illustrations appended herewith, in which.

DETAILED DESCRIPTION

Figure 1:
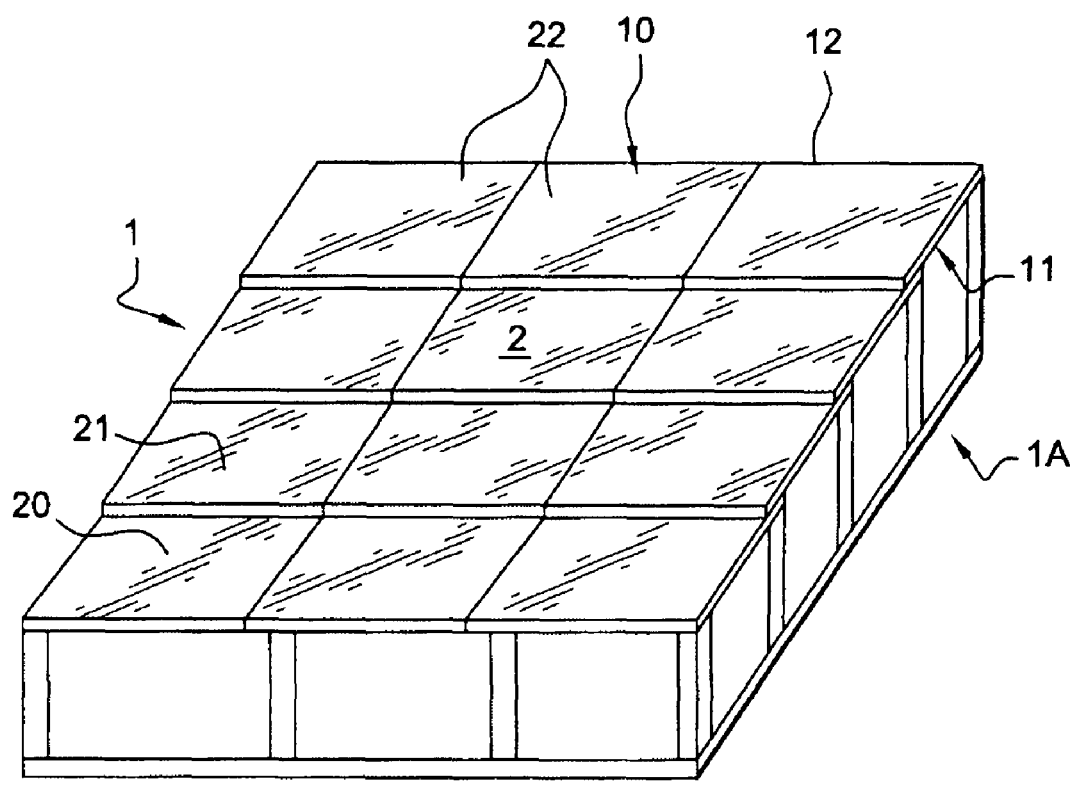
FIG. 1 is a perspective view of a roofing assembly according to the invention joined to a framework.

FIG. 1 illustrates a solar roofing assembly 1 according to the invention mounted on the framework 1A of a dwelling (not illustrated). The term "framework" is understood as being any means for supporting and helping to fasten the roofing assembly. The roofing assembly 1 preferably has a slope, like most roofing assemblies, that defines a ridge 12.

The roofing assembly 1 has a cover 2 formed by joining together a plurality of flat glass substrates 20, 21 and 22, giving a unitary and continuous surface appearance. The cover 2 has an upper face 10, which faces the external environment and is intended to receive the light energy, and, on the opposite side, an inner face 11 that faces the framework 1A.

As a variant, the glass substrates 20 to 22 form only a portion of the cover, the remainder possibly consisting of usual covering means, such as tiles or slates. However, the glass substrates will be integrated so as to be coplanar with the other covering means in order to establish a substantially flat surface covering.

The glass substrates 20 to 22 have no metal frame, so as to avoid thermal bridges.

The glass substrates are made of tempered monolithic glass, or of laminated glass comprising for example a glass sheet, a polymer interlayer and another glass sheet, or a plastic film. It is also possible to envision insulating glazing units, except in the case of the photovoltaic devices. The composition of the glass substrates will in particular be chosen according to the application of the substrate, as regards its use for photovoltaic devices (substrates 20), for a hot-water collector (substrates 22) and a simple transition cover or hot-air collectors (substrates 21).

Figure 2A:
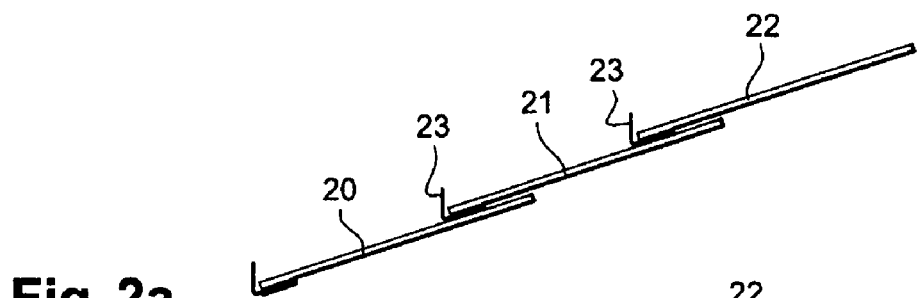
FIGS. 2a and 2b are sectional partial views of FIG. 1 according to two embodiments of assembling the cover of the roofing assembly.

FIG. 2a shows a preferred configuration, in which the glass substrates are placed so as to overlap one another in the manner of tiles or slates. They are joined together by fastening means 23, such as hooks as illustrated in FIG. 2a. The method of fastening photovoltaic glass tiles sold by the company Solarwood may, for example, be mentioned.

According to the invention, the roofing assembly requires a supply of air, in particular for cooling the photovoltaic devices. When such an assembly of substrates is not sealed, the air entering between the tiles in the overlap zone will thus be used directly.

Figure 2B:
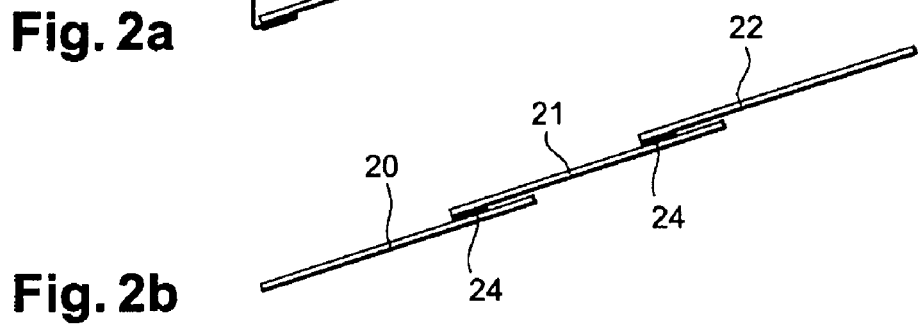

In the embodiment shown in FIG. 2b, the substrates are joined by fastening means (not shown) other than hooks and have, at their joins, airtight seals 24. To deliver a supply of air, it will be necessary to provide an air intake, preferably at the gutter located at the opposite free end of the ridge.

It is also possible to envision a combination of separate fastening modes and to join the substrates without or with sealing means. In all cases, it is necessary to provide one or more air intakes from the outside, between the substrates when there is no sealing provided, and/or at one or more specific air intakes preferably placed in the bottom portion of the roofing assembly.

Advantageously, the glass substrates 20 to 22 include functional layers, such as an antireflection coating in order to minimize reflection losses and/or to maximize the penetration of solar radiation. For an application relating to a hot-air collector, the antireflection coating is preferably placed on the two opposed faces of the substrates 21.

Likewise, a low-emissivity coating may be provided in order to prevent thermal losses by reflecting the infrared that has passed through the substrates, and to confine said infrared beneath the roofing assembly. The low-emissivity coating is placed on the opposite face from that facing the external environment and may replace an antireflection coating.

Finally, the glass substrates 20 to 22 may be screen-printed on the opposite face from that facing the external environment, with a black frame in order to make the unitary appearance of the overall cover 2 more attractive and possibly mask certain elements placed beneath the lower face 11 of the cover.

Figure 3:
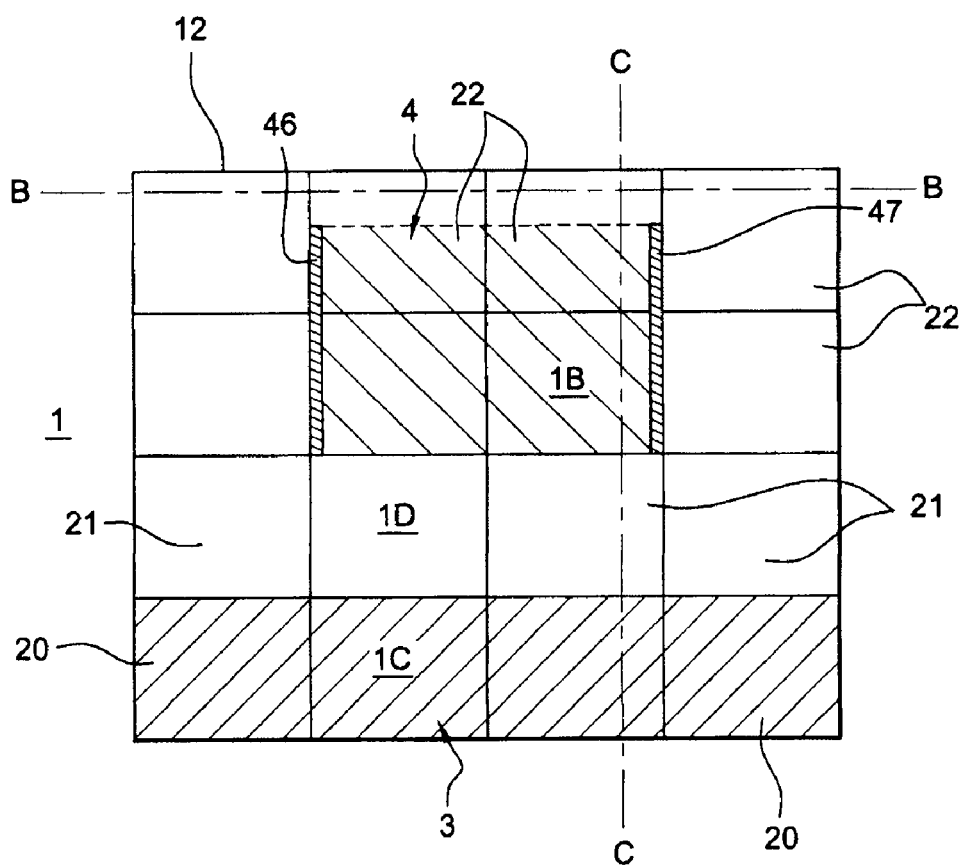
FIG. 3 is a schematic top view of the roofing assembly of FIG. 1.

As shown schematically in FIG. 3 by cross-hatched zones, the solar roofing assembly 1 includes at least one photovoltaic device 3 and at least one thermal solar collector 4 capable of delivering hot water.

Advantageously, when the roofing assembly has a slope, the invention provides for the hot-water collector or collectors 4 to be placed in the upper portion 1B of the roofing assembly near the ridge 12, where the heat is greater, while the photovoltaic devices 3 are placed in the lower portion 1C so as to minimize their overheating, which would otherwise reduce their efficiency.

The photovoltaic device or devices 3, and the hot-water collector or collectors 4, may be adjacent or else preferably, as illustrated in FIG. 3, separated by a transition zone 1D.

Each hot-water solar collector 4 is placed as close as possible to the ridge 12 but, however, at a certain distance away from the edges of the roofing assembly so as to eliminate thermal conduction losses if the collector were to be in contact with the ridge—a few centimeters are sufficient for this purpose.

Figure 4:
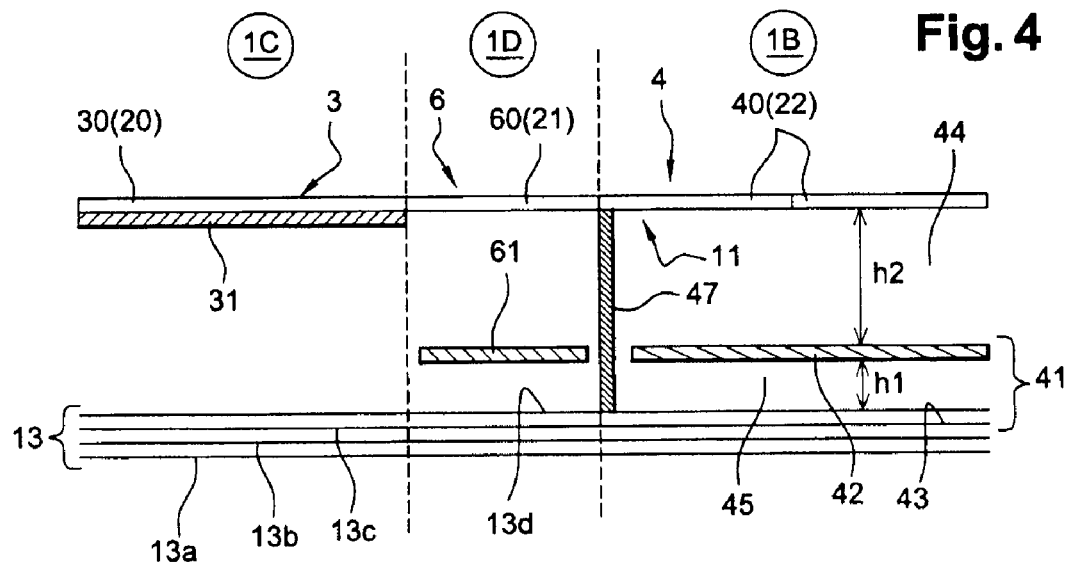
FIG. 4 is a side view, in cross section along the axis C-C of FIG. 3.

As shown in FIG. 4, each photovoltaic device 3 has a front structure 30 and a rear structure 31.

Several configurations may be envisioned depending on the method of manufacturing the photovoltaic device.

The front structure 30 consists of a glass cover substrate 20, whereas the rear structure 31 consists of photovoltaic cells of known type based on semiconductor materials deposited, during manufacture, on a support substrate made of glass or another material. The cells may even be encapsulated in glass. The rear structure 31 is then attached on site to the glass substrate 20.

As a variant, the front structure 30 comprises a glass substrate 20 and the thin-film photovoltaic cells, while the transparent rear structure 31, preferably made of glass, is placed against the front structure, especially during installation of the roofing assembly.

In yet another variant, the front structure 30 and the rear structure 31 form, during manufacture, a one-piece assembly incorporating the photovoltaic cells.

It is also conceivable for a number of substrates 20 to form the structure 30, while the rear structure 31 is formed from a single surface extending beneath and joined to the number of substrates 20, the photovoltaic cells being integrated between the front and rear structures, preferably secured to the rear structure during manufacture.

Each hot-water solar collector 4 comprises, as shown in FIG. 4, a front structure 40 formed by one or more cover glass substrates 22, and a rear structure 41 comprising an absorber 42 and a thermal insulation 43. There may be several hot-water solar collectors if several absorbers are used.

The absorber 42 comprises an element through which a heat-transfer fluid flows. This element may be made of a plastic, such as EPDM (ethylene-propylene-diene monomer) or XHDPE (crosslinked high-density polyethylene), coated with an absorbent layer, preferably black in color. As a variant, the element is made of copper, soldered to a foil that absorbs solar radiation, which, for example, is itself made of copper or aluminum, coated with an absorbent layer, again black in color.

The absorber 42 is placed at a distance $h_2$ from the glass front structure 40 so as to create an air layer 44 above the absorber.

The absorber is supported by the framework, either suspended therefrom or placed thereon.

The thermal insulation 43 serving to limit the heat losses may be placed against the absorber, on that face on the opposite side from the one facing the front structure (not illustrated). However, the thermal insulation 43 is preferably placed at a distance $h_1$ from the absorber 42, as illustrated in FIG. 4, so as to create a space 45 for an air flow to circulate beneath the absorber so as to double the area for heat exchange between the hot air and the absorber.

The absorber must be quite close to the glass structure 40 since fluid heating takes place primarily by the solar-radiation-absorbent foil being heated up. However, the presence of the air layer 44 of height $h_2$ makes it possible, when there is less sunlight, to heat the absorber by heat exchange with the hot air circulating in this zone.

The presence of the space 45 beneath the absorber, in which hot air circulates, enables the absorber to be heated on its lower face as well. Preferably, the height $h_1$ is less than or equal to the height $h_2$, and the distance $h_1+h_2$ is between 10 and 100 mm, in particular between 30 and 50 mm.

In order, on the one hand, to best confine the hot air in the zones 44 and 45, so as to maximize the function of each hot-water solar collector 4, and, on the other hand, to ensure effective ventilation around each photovoltaic device 3 so as not to overheat it, it is preferable to place flow insulation barriers 46 and 47, visible through transparency in FIG. 3, which extend perpendicular to the roofing assembly from the inner face 11 of the glass cover 2 and on each lateral side of the collector 4, from the ridge toward the photovoltaic devices. This arrangement of the barriers guarantees an opening onto the zone 1C of the photovoltaic devices.

These thermal insulation barriers are fastened to the rafters of the framework and made, for example, of EPDM insulating foam. They are preferably black in color, identical to that of the other elements such as the absorber 42 for the sake of the esthetics of the roofing assembly.

Figure 5:
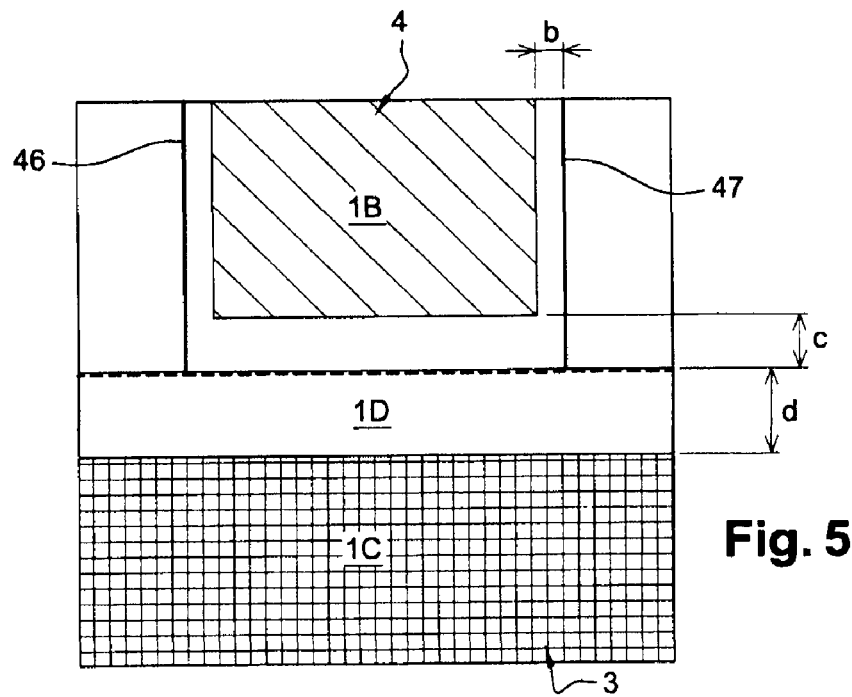
FIG. 5 illustrates a sectional top view of FIG. 1.

FIG. 5 is a schematic top view of the various elements of or joined to the roofing assembly in its rear structure. Illustrated in this figure are the barriers 46 and 47 placed, transversely to the slope of the roof, at a certain distance b from the hot-water collector 4, preferably greater than 5 cm therefrom. They preferably extend beyond the collector 4 by a distance c, in the slope direction of the roof, of about 10 to 50 cm so as to provide a temperature gradient zone between the transition zone 1D and the bottom of the hot-water solar collector 4. When a transition zone 1D is provided, it extends between the end of the insulation barriers 46 and 47 and the photovoltaic devices 3 over a minimum distance d of between 10 and 50 cm.

Of course, the roof of the dwelling provided with the roofing assembly of the invention includes thermal insulation means that are placed in the framework at a certain distance from the roofing assembly. FIG. 4 illustrates these thermal insulation means 13 which, as is known, make it possible to insulate the interior of the dwelling from the cold air or hot air from the outside and to reduce thermal losses inside the dwelling.

The thermal insulation means 13 comprise, in succession, stacked on the opposite side from the roofing assembly and toward the latter, an insulating blanket 13a based on thermal insulation fibers, of the mineral or plant-based or animal-based fiber type, or based on polystyrene, and a vapor barrier film 13b, the water-impermeable face of which is turned toward the roofing assembly.

According to the invention, a film 13c that reflects the far infrared radiation is placed on the vapor barrier film. This reflecting film has the advantage of sending the heat back into the space separating the thermal insulation means 13 from the roofing assembly 1 and contributes to the air heating in the zone 45, the heat of which is picked up by the absorber 42.

Advantageously, the material Tyvek Reflex® from the company DuPont de Nemours that combines the elements 13b and 13c will be used.

It is also possible to place, on top of or instead of the reflecting film 13c, a porous black material 13d made of EPDM or of felt, which would give the overall roof a black color in order to give the roof a uniform color when seen through the glass cover 2. This material has the capacity of absorbing solar radiation and enables the thermal efficiency of the or each hot-water solar collector 4 to be increased in the absence of hot-air collectors 6.

It is important not to overheat the space surrounding the photovoltaic devices 3, so as not to reduce their efficiency. Thus, the invention provides for there to be forced convection of the air flow, in order to ensure that the devices are effectively cooled.

Figure 6:
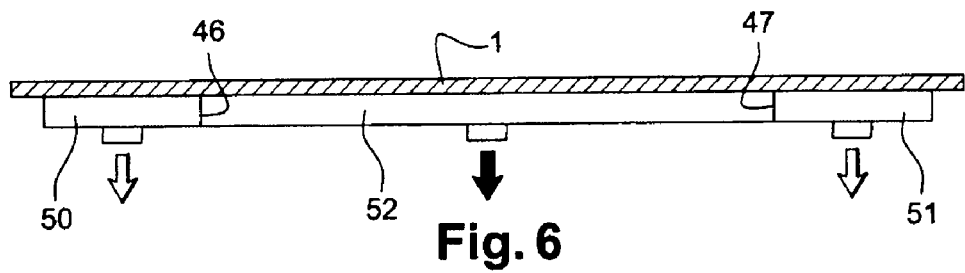
FIG. 6 is a partial side view in cross section along the axis B-B of FIG. 3.

For this purpose, convection means comprising air extractors are advantageously installed near the ridge and beneath the roofing assembly, as shown in FIG. 6.

FIG. 6 shows in particular two lateral extractors 50 and 51 and one central extractor 52, according to the size of the roof. The central extractor is placed in the zone in which the hot-water solar collector 4 is placed, while the lateral extractors 50 and 51 are placed on either side of the insulation barriers 46 and 47 respectively.

This ideally enables the hot air to be extracted beneath the roofing assembly and, by the influx of cold air from the outside, in particular in the unsealed join zone between the glass substrates, to provide ventilation around the photovoltaic devices. In addition, the recovered hot air may also be recycled, by feeding heat pump systems or air/water heat exchangers for the production of low-temperature hot water for domestic heating, including seasonal storage systems preferably placed in the ground.

As already mentioned above, a transition zone 1D, as illustrated in FIGS. 3 and 4, may be provided so that the photovoltaic devices 3 are not too close to the hot-water solar collector or collectors 4.

Hot-air thermal collectors 6 of known type may be added in this transition zone, which collectors, visible in FIG. 4, make it possible to absorb the solar radiation and exchange heat effectively with the surrounding air. The transition glass substrates 21 in this zone 1D constitute the front structures 60 of the hot-air thermal collectors 6.

The absorbers 61 of the collectors 6 are placed at a distance from the lower face 11 of the cover 2 and from the thermal insulation means 13, or they may be supported directly by the insulation means 13. The same distances $h_1$ and $h_2$ as those associated with the absorber 42 of the hot-water collector 4 may be established.

As a variant, these absorbers 61 of the hot-air collectors are formed by the black material 13d when the latter is provided.

The amount of hot air produced beneath the roofing assembly and entering the zone 1B is particularly substantial, thereby ensuring very hot water for the or each hot-water collector 4, which can be used directly for sanitary requirements, unlike the conventional hot-water collectors.

Moreover, if the water is too hot, the presence of the hot-air extractors, essentially the central extractor 52, ensures, by controlled extraction of the air, suitable cooling of the hot-water solar collector 4. This regulation, by controlling the flow rate of the extractors and according to the zone in which they are placed, enables the air velocities to be modified according to the zones of the roofing assembly.

Thus, according to the invention, the front structures of the photovoltaic devices and of the hot-water solar collectors provide a uniform glass covering 2. This front structure can be easily mounted, since it simply requires the roof to be covered with glass substrates. This operation is performed by the roofer without intervention by more specialized companies being involved.

Furthermore, the configuration of the roofing assembly and the arrangement of the photovoltaic device or devices and the hot-water collector or collectors make it possible to supply electricity and hot water, even very hot water, in order to meet the electrical and thermal requirements of the dwelling.

Finally, the air extractors form effective means that complement the energy performance of the roofing assembly. The flow rate of the extractors will be adapted according to the geographical location of the dwelling and the climate, involving a greater or lesser amount of sunshine. The flow rate will act on the velocity of the air flow that may furthermore be different depending on the extraction zones. Advantageously, the flow rates will be regulated by automated control means, such as a speed controller and temperature sensors placed in the appropriate zones.

The invention claimed is:

1. A solar roofing assembly comprising:
    at least one photovoltaic device, including a front structure and a rear structure; and
    at least one hot-water solar collector, including a front structure and a rear structure,
    wherein the respective front structures of the photovoltaic device and of the hot-water solar collector include respective glass substrates forming a cover that has an upper face configured to face an external environment, and, on an opposite side of the cover, an inner face,
    wherein the respective rear structures of the photovoltaic device and of the hot-water solar collector are placed beneath the cover, facing the inner face, and
    wherein each of the glass substrates is frameless and the glass substrates are joined together, either directly or separated by transition substrates made of glass, so as to form a uniform unitary glass cover.

2. The roofing assembly as claimed in claim 1, wherein the assembly is assembled so as to form a slope defining a ridge, an upper portion of the slope being close to the ridge and a lower portion of the slope being away from the ridge, and
    wherein each photovoltaic device is placed in the lower portion, and each hot-water solar collector is placed in the upper portion.

3. The roofing assembly as claimed in claim 1, further comprising two thermal insulation barriers disposed beneath and perpendicular to a surface of the inner face of the cover, the insulation barriers being placed laterally on both sides of the hot-water solar collector so as to leave a zone extending toward the photovoltaic device open.

4. The roofing assembly as claimed in claim 1, further comprising a forced convection device, which is an extractor for forced convection of air flow circulating beneath the roofing assembly,
    wherein a flow rate of the forced convection device is selectively adjusted according to a zone in which the forced convection device is positioned and/or according to environmental conditions.

5. The roofing assembly as claimed in claim 1, wherein the photovoltaic device is separated from the hot-water solar collector by a transition zone having hot-air thermal collectors configured to generate hot air, and
    wherein a front structure of the hot-air thermal collectors is formed by the glass transition substrates.

6. The roofing assembly as claimed in claim 1, wherein the rear structure of the photovoltaic device comprises at least one support substrate joined to the front structure, photovoltaic cells being arranged between the front structure and the at least one support substrate of the rear structure of the photovoltaic device.

7. The roofing assembly as claimed in claim 1, wherein the rear structure of the hot-water solar collector includes
- an absorber placed at a distance $h_2$ from the front structure of the collector, and
- a thermal insulation placed beneath the absorber, on the opposite side from the cover and in a juxtaposed manner or at a distance $h_1$ from the absorber, and
wherein a quantity $h_1+h_2$ is between 10 and 100 mm.

8. The roofing assembly as claimed in claim 1, wherein the at least one photovoltaic device, the at least one hot-water solar collector, and one or more hot-air thermal collectors are each distributed, respectively, over one-third of the roofing assembly.

9. The roofing assembly as claimed in claim 1, wherein the glass substrates and the glass transition substrates are formed from tempered monolithic glass or from laminated glass.

10. The roofing assembly as claimed in claim 1, wherein the glass substrates and the glass transition substrates are fastened together by means of hooks.

11. The roofing assembly as claimed in claim 1, wherein at least the glass substrates, include antireflection and/or low-emissivity functional coatings.

12. The roofing assembly as claimed in claim 1, further comprising a framework on which a rear structure of the hot-water solar collector is joined.

13. The roofing assembly as claimed in claim 12, wherein the framework includes thermal insulation means including a heat-reflecting film placed facing the inner face of the cover, the heat-reflecting film being a thermal insulation for absorbers of each hot-water solar collector and hot-air thermal collector.

14. The roofing assembly as claimed in claim 7, wherein the quantity $h_1+h_2$ is between 30 and 50 mm.

15. The roofing assembly as claimed in claim 9, wherein the glass substrates of the at least one hot-water solar collector and the glass transition substrates are formed from double glazings.

16. The roofing assembly as claimed in claim 11, wherein the glass substrates and the glass transition substrates include antireflection and/or low-emissivity functional coatings.

17. A solar roofing assembly comprising:
- a photovoltaic device including a glass substrate; and
- a hot-water solar collector including a glass substrate,
- wherein the respective glass substrates of the photovoltaic device and of the hot-water solar collector are arranged as a cover, the cover having an upper face and an inner face opposing the upper face, and
- wherein the glass substrates of the photovoltaic device and of the hot-water solar collector are frameless and are joined together via transition substrates made of glass, so as to form a uniform unitary glass cover.

* * * * *